United States Patent [19]

Nuckolls et al.

[11] Patent Number: 4,687,618
[45] Date of Patent: Aug. 18, 1987

[54] LASER-FUSION TARGETS FOR REACTORS

[75] Inventors: John H. Nuckolls; Albert R. Thiessen, both of Livermore, Calif.

[73] Assignee: The United States of America as represented by the United States Department of Energy, Washington, D.C.

[21] Appl. No.: 609,841

[22] Filed: Sep. 2, 1975

[51] Int. Cl.$^4$ ............................................. G21B 1/00
[52] U.S. Cl. ..................................... 376/152; 376/103
[58] Field of Search ............................... 376/152, 103

[56]  References Cited

U.S. PATENT DOCUMENTS

| 3,303,097 | 2/1967 | Mallinckrodt | 176/1 |
| 3,346,458 | 10/1967 | Schmidt | 176/1 |
| 3,624,239 | 11/1971 | Fraas | 176/1 |
| 3,764,466 | 10/1973 | Dawson | 176/1 |
| 3,953,617 | 4/1976 | Smith et al. | 176/1 |
| 4,021,253 | 5/1977 | Budrick et al. | 176/1 |
| 4,058,486 | 11/1977 | Mallozzi et al. | 176/1 |

FOREIGN PATENT DOCUMENTS 1195602  6/1970  United Kingdom ..................... 176/1

OTHER PUBLICATIONS

LA-UR-5783-MS, Fraley et al., 11/74, pp. 1-8.
JETP Lett., vol. 21, No. 2, pp. 68-70, 1/75, Afanas'ev et al.
Physics Today, 3/75, pp. 17, 20.
UCRL-50021-74, 3/75, pp. 365, 367, 372, 374, 379, 387-395.
Science, vol. 186, 11/74, p. 519.
Nuclear Fusion, vol. 14, No. 4, 9/74, pp. 511-515, Lindl.
UCRL-51609, Souers et al., 7/74, pp. 1-5, 22-27.
Laser Focus, 12/74, McCall et al., pp. 40-43.
ANS Trans., vol. 18, 6/74, pp. 18-21, Seifritz et al.
Nuclear Fusion, vol. 15, Apr. 1975, pp. 333-335.
Marwick, "Exploding Reactors for Power", 1/73, pp. 9, 10, 17-19, 26-28, 32-34, 38.
NSENAO-58, No. 2, 10/75, pp. 107, 108, 118, 119.
ERDA-28, 1/75, pp. 1-3, 8-10.
Nuclear News, 5/75, pp. 79, 80.
UCID-17297, 3/28/73, Kidder, pp. 1-4.
ORNL-TM-3231, 7/71, Fraas (II), pp. 17, 18.
UCRL-74345, Rev. 1, 7/23/73, Nuckolls, pp. 1-4, 34.
Physics Today, 5/78, pp. 50-57, by C. Martin Stickley.
The Wall Street Journal, 8/28/79, pp. 1, 15.
Nature, vol. 281, 10/11/79, pp. 414, 415.
"Statements on the LLL Laser Fusion Program Prepared for the JCAE Hearings on Fusion", 3/11/76, Emmett, pp. 1-3.
Science, vol. 188, 4/75, pp. 30-34.
Technology Review, 12/76, pp. 20-33, 39, 41-43.

Primary Examiner—Harvey E. Behrend
Attorney, Agent, or Firm—L. E. Carnahan; Roger S. Gaither; Judson R. Hightower

[57]  ABSTRACT

A laser target comprising a thermonuclear fuel capsule composed of a centrally located quantity of fuel surrounded by at least one or more layers or shells of material for forming an atmosphere around the capsule by a low energy laser prepulse. The fuel may be formed as a solid core or hollow shell, and, under certain applications, a pusher-layer or shell is located intermediate the fuel and the atmosphere forming material. The fuel is ignited by symmetrical implosion via energy produced by a laser, or other energy sources such as an electron beam machine or ion beam machine, whereby thermonuclear burn of the fuel capsule creates energy for applications such as generation of electricity via a laser fusion reactor.

2 Claims, 10 Drawing Figures

LASER-FUSION TARGETS FOR REACTORS

The invention described herein was made in the course of, or under, Contract No. W-7405-ENG-48 with the United States Energy Research and Development Administration.

BACKGROUND OF THE INVENTION

This invention relates to thermonuclear fuel targets, particularly to small thermonuclear fuel targets, and more particularly to such targets for a laser fusion reactor which includes material for producing an atmosphere around the target.

Laser-induced fusion has recently joined magnetic-confinement fusion as a prime prospect for generating controlled thermonuclear power. During the past few years much effort has been directed toward the development of fusion fuel targets or capsules and laser-initiated systems for causing implosion and thermonuclear burn of such capsules as exemplified by U.S. Pat. Nos. 3,489,645 issued Jan. 13, 1970 to J. W. Daiber et al; 3,624,239 issued Nov. 30, 1971 to A. P. Fraas; 3,723,246 issued Mar. 27, 1973 to M. J. Lubin; 3,723,703 issued Mar. 27, 1973 to K. W. Ehlers et al; and 3,762,992 issued Oct. 2, 1973 to J. C. Hedstrom. Compression of fuel capsules by laser to initiate thermonuclear fusion is described in detail, for example, by an article published in Nature, Vol. 239, No. 5368, pp. 139–142, Sept. 5, 1972 entitled "Laser Compression of Matter to Super-High Densities: Thermonuclear (CTR) Applications" by John H. Nuckolls et al, and an article published in Physics Today, August 1973 entitled "Laser-Induced Thermonuclear Fusion" by John H. Nuckolls et al. By way of example, copending U.S. patent application Ser. No. 306,237 filed Nov. 14, 1972, now abandoned in the name of L. L. Wood et al discloses and claims a system for generating electricity by implosion of laser-fusion targets.

Also, recent efforts have been directed to the fabrication of laser-fusion targets or fuel capsules compatible with laser energy and cost requirements for commercial power production as described briefly in the above-cited Nature article and in greater detail in an article entitled "Spherical Hydrogen Targets for Laser-Produced Fusion" by I. Lewkowicz, J. Phys. D: Appl. Phys., Vol. 7, 1974. Also, copending U.S. patent application Ser. No. 446,066 filed Feb. 26, 1974, now U.S. Pat. No. 3,907,477 issued Sept. 23, 1975 in the name of T. R. Jarboe et al discloses and claims a method and apparatus for fabricating laser-fusion targets, while articles entitled "Hydrogen Pellet Generation for Fusion Research" by C. D. Hendricks, "Production of Solid Pellets for Laser Initiated Target Plasma in BBII" by A. L. Hunt et al, and "Hollow Hydrogen Shells for Laser-Fusion Targets" by C. D. Hendricks et al, published in the Bulletin of the American Physical Society, Series II, Vol. 19, October 1974, pages 915, 963 and 927, respectively, are directed to fabrication of laser-fusion targets.

The success of any laser fusion system for the production of useful power depends critically on the production of suitable targets or fuel capsules which must satisfy a number of requirements in addition to low fabrication cost. Of critical importance to achieving sufficiently high energy gain are the effects of plasma instabilities, fluid instabilities, and the symmetry of the implosion. Thus, the target must have characteristics such as material composition, structure, and surface finish which are tailored to the laser pulse length, energy, peak and average power, and pulse shape.

The initial phase of a laser-driven implosion is the formation of an atmosphere surrounding the target, and thus efforts have been directed to various target configurations which are capable of producing this atmosphere, as well as other means such as gas injection, ablating of the explosive-chamber wall surface, etc. which produce a desired atmosphere about the target or fuel capsule.

SUMMARY OF THE INVENTION

The present invention is directed to small fusion fuel capsules or targets for use in laser-initiated fusion reactor systems capable of satisfying the above-outlined requirements for such targets. The target or capsule of this invention consists of a central quantity of thermonuclear fuel, in either solid or hollow shell configuration, surrounded by one or more layers or shells of material for forming an atmosphere around the target. In addition, the target may include an ablator layer or shell positioned about the fuel to effect the implosion thereof. The multiple-layer or shell target is injected or otherwise positioned in the path of one or more laser beams, generally directed into an evacuated chamber or housing whereby the fuel is imploded causing thermonuclear burn thereof producing energy for various applications;

This invention as set forth in the above-referenced U.S. Pat. No. 3,723,246 to M. J. Lubin, is useful in providing high temperature plasma. As such, this invention is useful in the wide variety of applications to which the heretofore known thermonuclear research reactors and/or plasmas have been used. For example, this invention is useful in producing freely expanding plasmas, and/or laser-target micro-explosions involving fusing nuclei. It is also useful in filling plasma into any of the heretofore known linear and/or closed plasma research reactors, such as stellarators, tokamaks, magnetic mirrors, and/or minimum B and/or minimum average B devices. In this regard, the plasma of this invention can be produced in situ or used for injection purposes. However, as will be understood by one skilled in the art, this invention is not limited to the above-mentioned uses, and this invention can be used in other applications requiring targets, and/or high temperature plasmas. Thus, this invention can be used for providing space propulsion, neutron production, as understood in the art, and/or it can be used in the fields of magneto hydro-dynamics or power production.

Therefore, it is an object of this invention to provide a small thermonuclear fuel capsule or target for ignition by laser or other energy sources.

A further object of the invention is to provide a small, multiple layered fusion fuel capsule for a laser fusion reactor.

Another object of the invention is to provide a small laser-initiated fusion fuel capsule having a central quantity of thermonuclear fuel, in either solid or hollow shell form, surrounded by at least one or more layers of material capsule of forming an atmosphere about the capsule.

Another object of the invention is to provide a laser fusion target having an ablator layer interposed between the fusion fuel and at least one layer of atmosphere forming material.

Other objects of the invention will become readily apparent from the following description and accompanying drawings.

DESCRIPTION OF THE INVENTION

Broadly, the present invention is a small thermonuclear fuel capsule or target capable of being ignited by energy from a laser, or other energy source such as an electron beam generating machine, constructed primarily for a laser fusion reactor, and having the above-described characteristics required for achieving sufficiently high energy gain need for such reactors.

More specifically, the fuel capsule or target described herein is a multiple-layered capsule having at least one or more layers or shells of material about a central section of fuel capable of forming the needed atmosphere about the capsule. In certain embodiments the centrally located fuel is positioned in spaced relationship within the atmosphere forming material by support means, such as tangential plastic film known in the art, or is separated from the atmosphere forming material by at least one layer or shell of material forming a pusher or ablator. The centrally located fuel is in the form of a solid sphere or a hollow shell in the different embodiments.

As pointed out above, a target or fuel capsule for a laser fusion reactor must satisfy a number of requirements in addition to low fabrication cost; and of critical importance to achieving sufficiently high energy gain are the effects of plasma instabilities, fluid instabilities and the symmetry of the implosion. Computer calculations have been made of a target consisting of a spherical solid drop of DT surrounded in spaced relation by a concentric shell of DT. Gains greater than 40-fold may be achieved from such targets with laser energies of $\sim 0.5$ MJ. and peak power of about $10^{15}$ W.

Figure 1A:
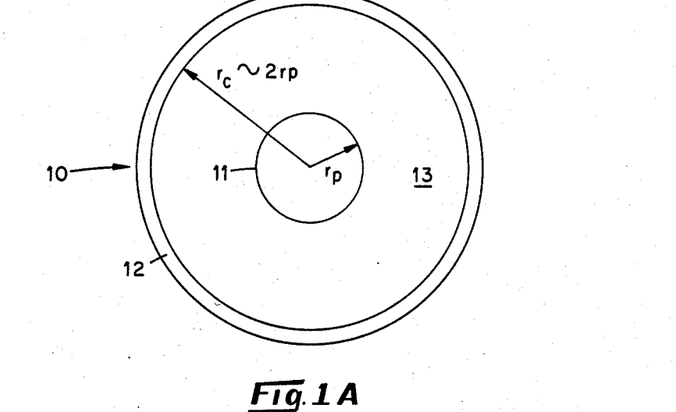
FIGS. 1A and 1B illustrate a cross-section of a solid target configuration and corresponding laser pulse shape, with the target having a solid fuel center and a shell of atmosphere forming material spaced therearound.
Figure 1B:
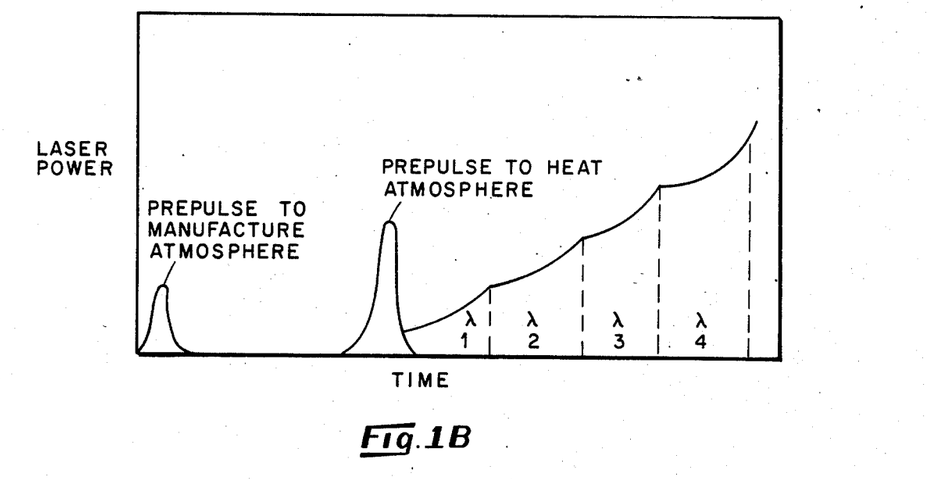

FIG. 1A illustrates such as solid target configuration indicated generally of 10 and the corresponding laser pulse shape showing laser power vs time being illustrated in FIG. 1B. The target 10 comprises a substantially spherical solid drop or core 11 of DT positioned within a thin concentric shell 12 of low Z material such as DT by means of tangential films, not shown, or other known support means.

Core 11 and shell 12 define a space 13 therebetween which is under low density gas in this embodiment. The inner radius of shell 12 is approximately twice the radius of core 11. The thin shell 12 is exploded with a low energy laser prepulse forming an atmosphere around the core 11. After the atmosphere has been formed, it is preheated with another prepulse which heats the electrons to several hundred electron volts, thus ensuring supersonic electron transport through the atmosphere and enhancing the subsequent implosion symmetry, these prepulses being shown in FIG. 1B. As shown in FIG. 1B, laser pulses of different wavelengths are used to implode the core 11 of FIG. 1A. The longest wavelength is used first because of symmetry requirements—it is absorbed at the lowest plasma density, and thus at the greatest distance from the core or drop 11. As the increasing intensity of the laser pulse results in generation of excessive numbers of superthermal electrons, the laser light frequency is doubled. This minimizes the effects of electron decoupling and preheat, and of anomalous electron conduction.

Design paraments of the FIG. 1 target include target mass, cloud mass, surface finish, and the Z of the core and shell, while design constraints include wavelength of laser light, and peak power. Typical values of these parameters are given in discussion of FIGS. 2A, 2B.

Certain important effects must be considered as mentioned above. Plasma effects include electron preheat and decoupling arising from the non-Maxwellian electron distribution generated by resonance absorption and by plasma instabilities, inhibited electron conduction whenever the ratio of electron to ion temperature, Te/Ti, exceeds a few fold, and reflective instabilities. The Brillouin stability may lead to large back-scatter, or effective reflection, of the incident laser light, unless a relationship of the form $\eta^2(L/\lambda_o) \lesssim 5$ is satisfied where, $$\eta^2 = \frac{E_c^2}{4\pi n_c k T_{ec}} = \frac{\text{energy density of laser light}}{\text{energy density of thermal electrons,}}$$
(evaluated at critical radius)

$$L = \frac{n_{ec}}{|\nabla n_{ec}|} \text{ ; plasma scale height}$$

$\lambda_o$ = vacuum wavelength of laser light

The Rayleigh Tayler fluid instability and implosion symmetry likewise play fundamental roles in the choice of target design parameters. Hollow targets have the important advantage of operating with lower laser power. This leads to the possibility of absorbing the laser light purely by collisional processes—without exciting plasma instabilities, while satisfying the Brillouin back-scatter criterion. The viability of hollow targets, as discussed above, is strongly limited by Rayleigh Taylor instability. The solid targets have the advantage of cheaper fabrication and minimum growth of fluid instabilities. Solid targets are calculated to survive the Rayleigh Taylor instability for initial surface perturbation amplitudes of $\sim 100$ Å. This relaxes the surface finish requirements for the target fabrication, relative to other target types. Solid targets have the disadvantage of requiring shorter wavelength laser light and high peak power, with the accompanying possibility of significant reflection loss of the laser light via the Brillouin instability.

Figure 2A:
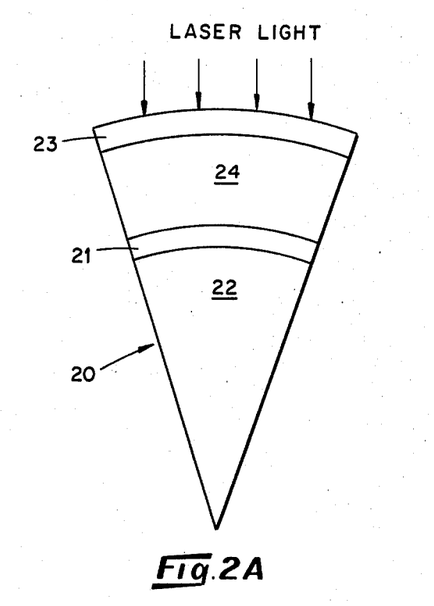
FIGS. 2A and 2B illustrate a section of a hollow target configuration and corresponding laser pulse shape, with the fuel encompassed by a plurality of layers of material.
Figure 2B:
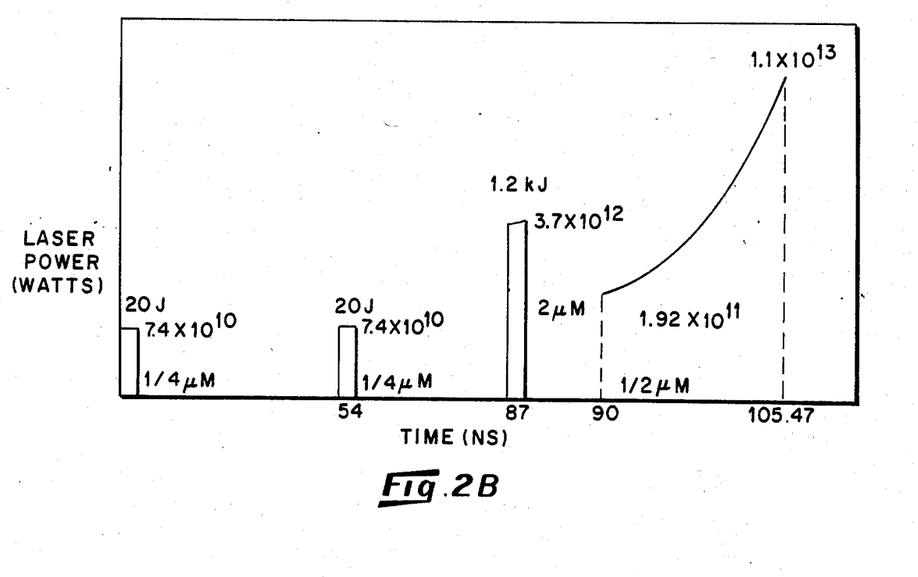

The initial phase of a laser-driven implosion is the formation of an atmosphere surrounding the target. FIGS. 2A and 2B illustrate a hollow target configuration and corresponding laser pulse shape. The FIG. 2A target embodiment generally indicated at 20 comprises a substantially shperical hollow inner shell 21 of DT defining a void 22 therein and having a mass of ~300 μg, inner radius of 1834 μM and wall thickness of 34 μM; surrounded in spaced relation by an outer shell 23 of DT having a mass of ~40 μg, inner radius of 2700 μM and wall thickness of 5 μM; shells 21 and 23 defining a space 24 containing helium (He). Shell 21 is supported within shell 23 by known means, such as strips of plastic film attached tangentially to the surface of the sphere. It is understood that shell 21 may be composed of other fuel such as $D_2$ or $D_xT_y$ with the same inner radius and mass as described above, while shell 23 may be composed of other low Z (1-13) materials, such as glass or carbon, with the same inner radius and mass as above, the mass of the outer shell 23 being about eight (8) times greater than that of the inner shell 21. Also space 24 could be evacuated or contain $H_2$ or DT in place of the He. As shown in FIG. 2B, two 20 joule laser pulses, indicated by the arrows and legend in FIG. 2A, are used to explode gently the outer shell 23 so that the perturbation of the inner DT shell surface is small. By ~87 ns, the density gradient in the atmosphere is directed radially outward. At this time, a 10 Kbar signal has propagated only 5 μM into the inner DT shell 21. This weak signal is overtaken by the much stronger signal generated by the laser prepulse (1.2 KJ) occurring at 87 ns. The energy gain of this hollow target is greater than 60-fold, the energy in ($E_{in}$) equals 42 KJ while the yield (Y) equals 2.6 MJ, with the total time from the initial prepulse to maximum laser power being 105.47 in this specific embodiment. The purpose of the helium or other gas in space 24 is to remove heat generated from the tritium decay and to act as an atmosphere (after explosion of the outer shell) through which energy is supersonically conducted to the inner shell before this shell is perturbed by implosion of the outer shell.

Figure 3A:
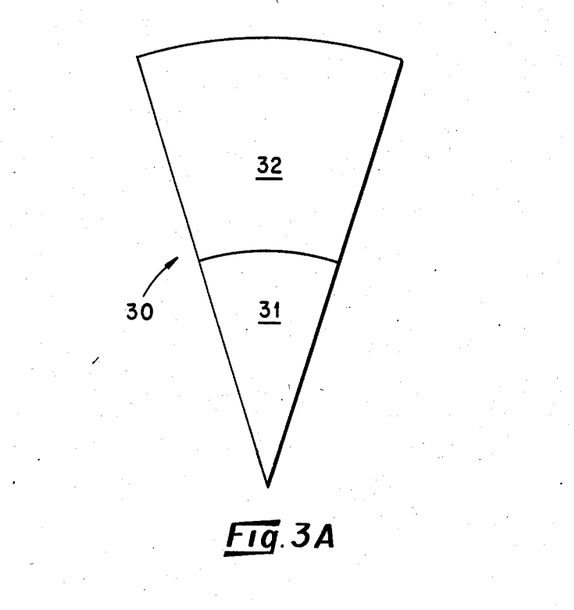
FIGS. 3A and 3B illustrate a section of a solid target with surrounding atmosphere and corresponding laser pulse shape.
Figure 3B:
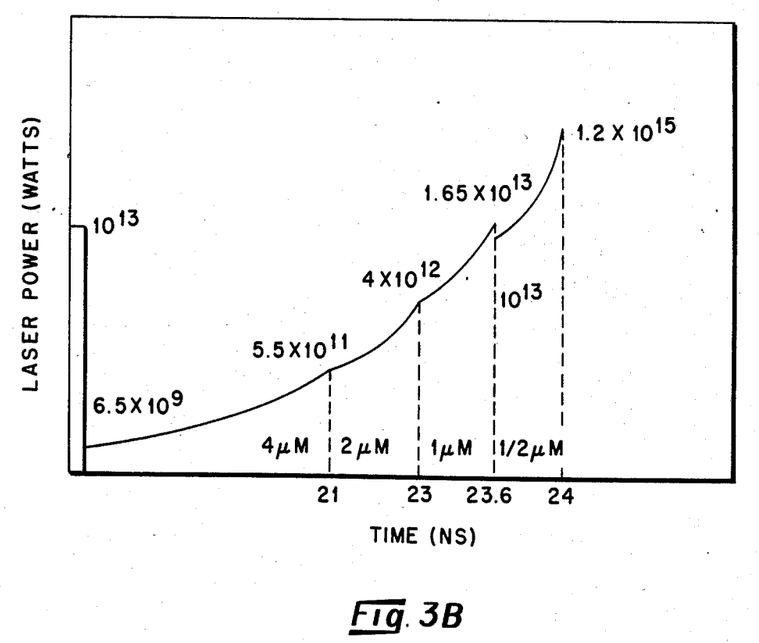

An example of a symmetrically imploded solid target and the corresponding laser pulse shape as illustrated in FIGS. 3A and 3B. The FIG. 3A target is generally indicated at 30 and comprises a central spherically configured core or drop 31 of solid DT surrounded by an atmosphere forming layer or shell 32 composed of DT. The DT core 31 has a mass of 60 μg and radius of 404.8 μM, while the shell or layer 32 has a mass of ~4 μg, an outer radius of 1404.8 μM, and a thickness of 1000 μM. The intensity of illumination seen by the target 30 varies sinusoidally by ±10% in the azimuthal coordinate with 20 wavelengths of such variations around the circumference of the target. A 100 joule prepulse heats the electrons in the atmosphere material layer 32, insuring rapid electron thermal conduction there. The implosion of the core 31 is started with a 4 μM-wavelength laser pulse, which is employed until the unablated core surface is at roughly half the critical radius for 2 μM light (90% of the implosion time). A frequency doubled laser pulse is then employed until the unablated core radius is roughly half the critical radius for 1 μM light. This technique of frequency-doubling the laser light continues until the final pulse (80% of energy) employed is $\frac{1}{2}$ μM. Absorption of the laser light at twice the core radius is probably not always necessary. It is clear that symmetry requirements are most severe at the beginning of the implosion, when the electron temperature is low and imprints of the laser spatial perturbations are initially and most severely made. In the FIGS. 3A and 3B embodiment, the $E_{in}$ equals 54 KJ and the Y equals 1.7 MJ.

Figure 4A:
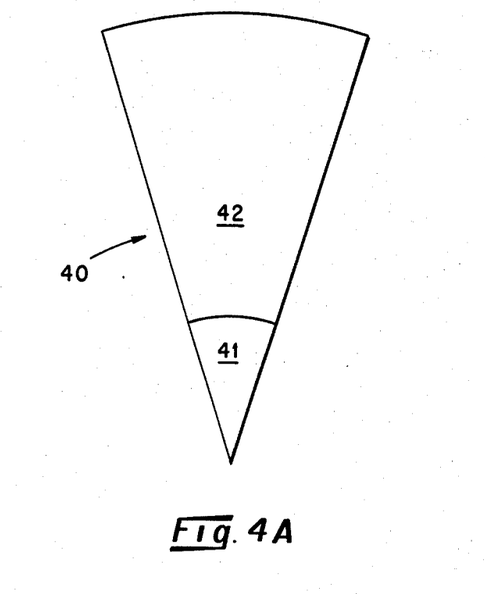
FIGS. 4A and 4B illustrate a section of a solid target with surrounding atmosphere and corresponding laser pulse shape designed for a laser fusion reactor.
Figure 4B:
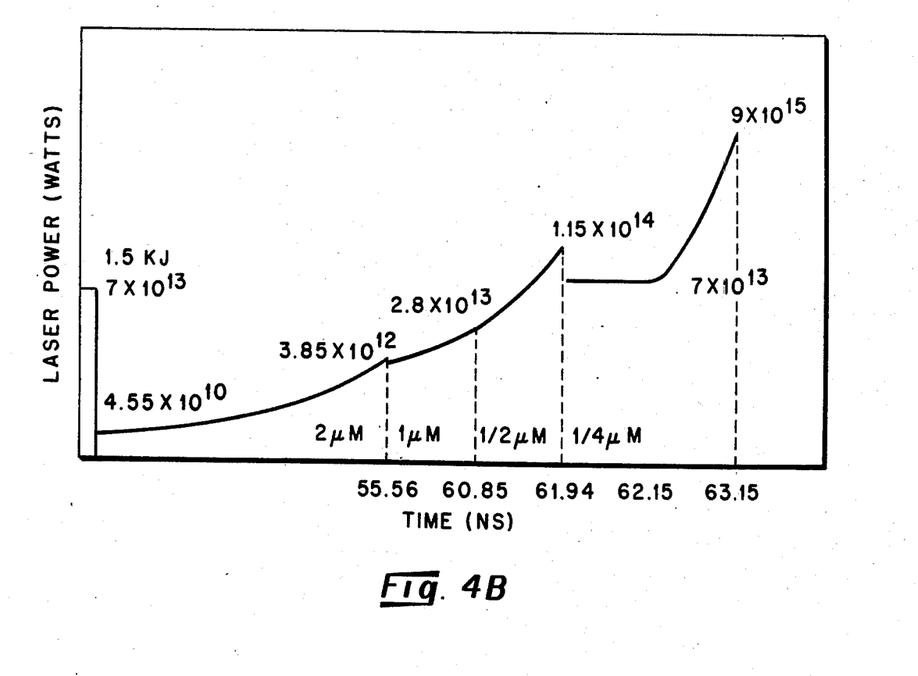

FIGS. 4A and 4B illustrate an example of a solid target and laser pulse shape therefor considered suitable for a laser fusion reactor. As shown in FIG. 4A, the target 40 comprises a solid spherical core 41 of DT having a mass of ~1 mg and radius of 1070 μM, surrounded by a layer 42 of atmosphere forming material formed from DT and having an outer radius of 3716 μM and thickness of 2546 μM. The solid DT core 41 is imploded with a laser pulse, shaped in frequency and time. The laser power varies in time $(1-(t/t_o))^{-2}$, where t is time, and $t_o$ varies from section to section of the plotted pulse shape so as to generate this pulse shape. The function of the prepulse illustrated in FIG. 4B in forming the atmosphere from layer 42 has been previously described. For roughly 90% of the implosion time a 2 μM wavelength is used. The light is then frequency doubled at appropriate times to satisfy the symmetry requirement previously discussed. The final 80% of the laser energy was delivered by $\frac{1}{4}$ μM wavelength light. Despite this short wavelength, the laser light was not entirely absorbed by classical processes; some was absorbed by the resonant process and the laser intensities exceeded the thresholds for the parametric decay instabilities. Consequently, superthermal electrons were generated. However, at this time, the target core 41 had been imploded to a sufficiently high density ratio (ρr) to shield the inner fuel from preheat by these hot electrons. As suggested by recent plasma instability calculations of resonance absorption, the superthermal spectral parameter, α, in $$\exp\left(\frac{\frac{1}{2}Mv^2}{\alpha KT}\right)$$

was six in this calculation. The harder α=12 spectrum can be tolerated, but required even higher laser powers and produced less gain because of decoupling and preheat effects. With the target configuration and laser pulse shape of the FIGS. 4A and 4B embodiment, with an energy input ($E_{in}$) of 900 KJ, a yield of 40 MJ is produced.

Figure 5A:
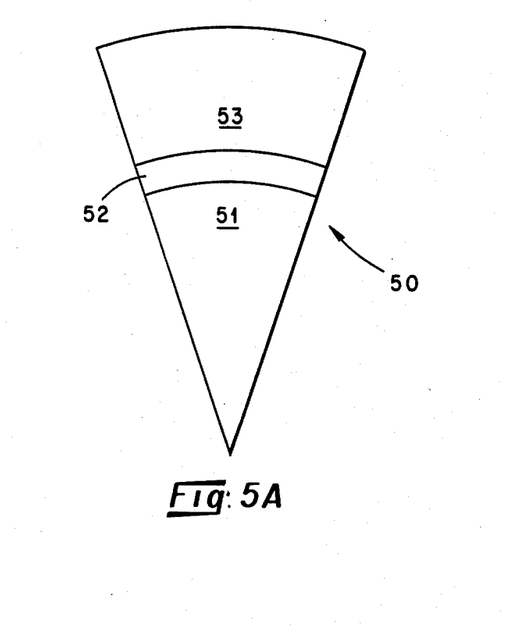
FIGS. 5A and 5B illustrate a section of a solid target with surrounding atmosphere and corresponding laser pulse shape, with the target having an ablator layer intermediate the fuel and the atmosphere forming material.
Figure 5B:
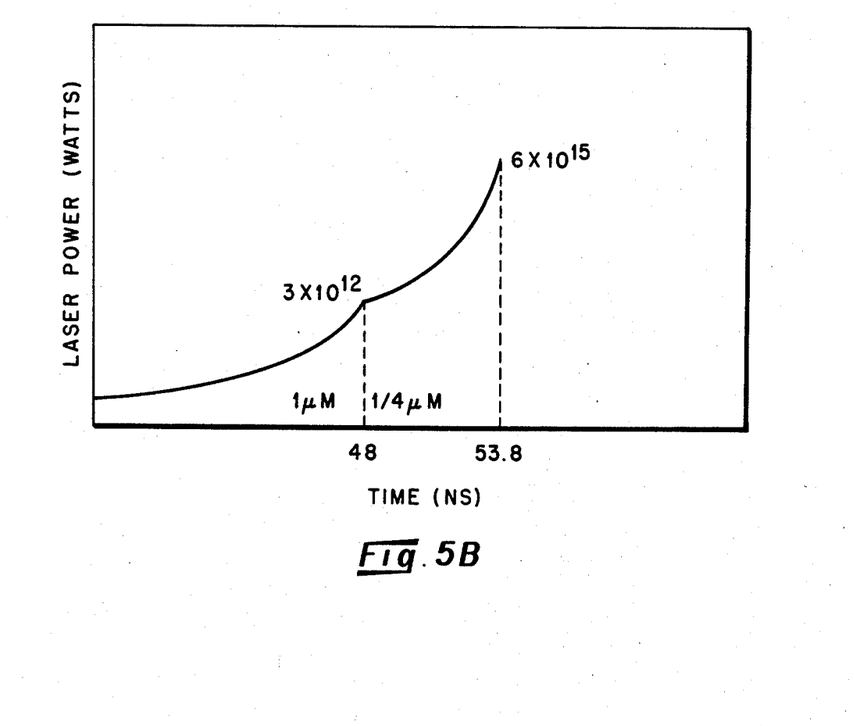

Because of the high laser power required to successfully implode solid targets, Brillouin backscatter is a concern. In addition, the peak ratio of electron to ion temperature for the FIG. 4A embodiment is roughly 20. Anomalous thermal conduction effects could be severe for such a large temperature ratio, hence a target configuration illustrated in FIG. 5A, with laser pulse shape therefor shown in FIG. 5B, which uses a low Z coated fuel core provides a solution. The peak ratio of electron to ion temperature in the FIG. 5A embodiment is reduced to a value of about 5, a ratio believed low enough to prevent severe anomalous conduction. The FIG. 5A target embodiment indicated generally at 50 comprises a central solid substantially spherically core 51 of DT having a radius of 768 μM and mass of 380 μg, an ablator layer or shell 52 surrounding the core 51 composed of neon (Ne) defining a pusher and having a mass of 2260 μg, an outer radius of 778 μM and a wall thickness of 10 μM, with a layer of atmosphere forming material 53 surrounding shell 52 composed of DT and having an outer radius of 1913 μM and a thickness of 1135 μM. For example, core 51 could be also composed of fuel such as D$_2$ or DHe$^3$; shell 52 also composed of glass or H$_2$ with the same mass; and the atmosphere forming material layer 53 may be composed of the same material as the ablator layer 52.

Figure 6:
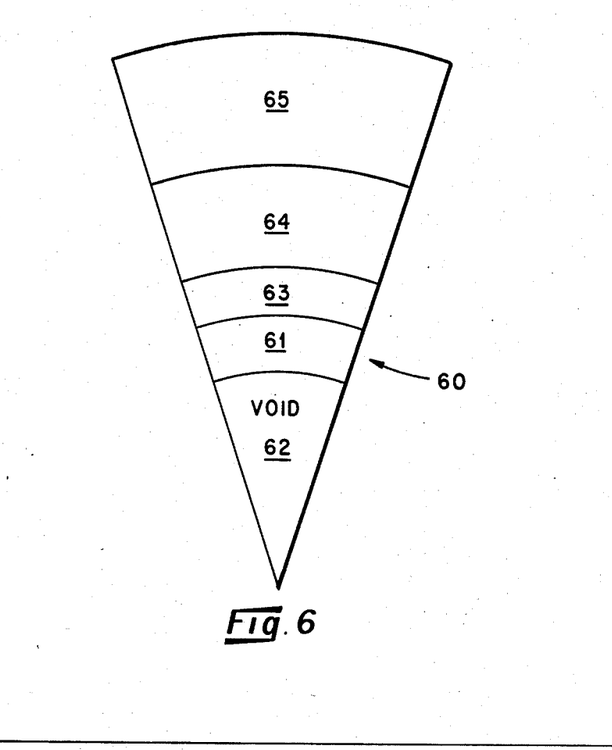
FIG. 6 illustrates a section of a hollow target having multi-layers of ablator and atmosphere forming material about the fuel.

FIG. 6 illustrates a multilayered hollow target or fuel capsule generally indicated at 60 and composed of a spherically shaped hollow shell 61 of DT defining therein a void 62 and surrounded by a layer or shell 63 of Ne defining a pusher about which is positioned two concentric layers or shells 64 and 65 of DT which form the atmosphere. Hollow shell 61 has an inner radius of 0.050638 cm, wall thickness of 0.009802 cm, density of 0.21 g/cm$^3$, and mass of 60 μg. Ablator shell 63 has an inner radius of 0.060440 cm, wall thickness of 0.000894 cm, density of 1.2 g/cm$^3$ and mass of 50 μg. Shell 64 has an inner radius of 0.061334 cm, wall thickness of 0.145993 cm, density of $1.1 \times 10^{-3}$ g/cm$^3$, and mass of 40 μg. Shell 65 has an inner radius of 0.207327 cm, wall thickness of 0.202026, density of $2 \times 10^{-4}$ g/cm$^3$, and mass of 50 μg. It is understood that each of the shells 61, 63, 64 and 65 may be constructed of other material and dimensions capable of producing the desired implosion characteristics.

Figure 7:
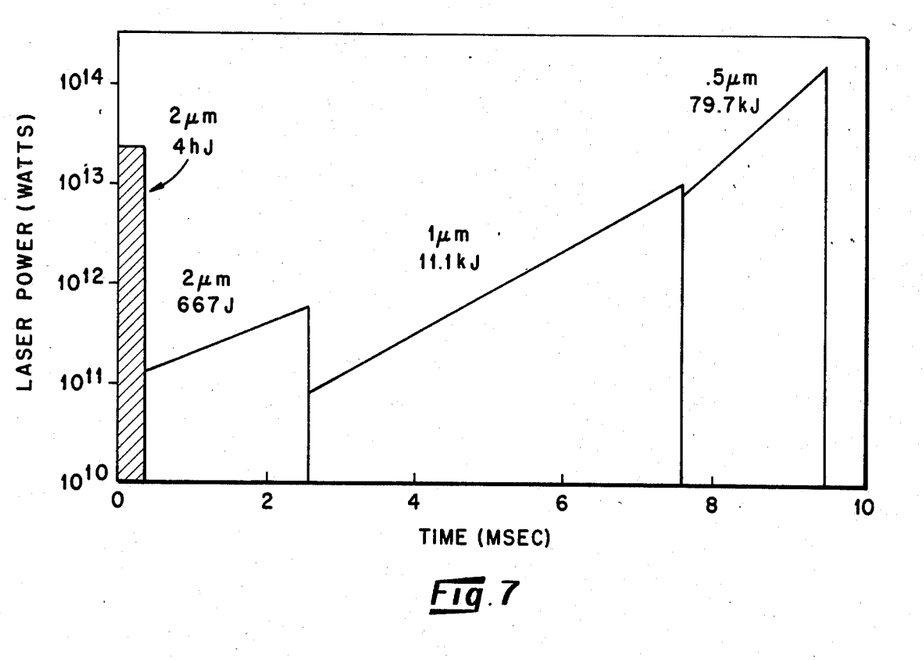
FIG. 7 graphically illustrates a laser pulse shape for the FIG. 6 target.

FIG. 7 illustrates the laser pulse shape for imploding the FIG. 6 embodiment, wherein each wavelength has the temporal shape $E(t) = t_o(1 - t/\alpha)^{-100}$. The total energy input is 95.5 KJ.

Implosion of the FIG. 6 target is briefly described as follows: Outer regions or shells 64 and 65 form an atmosphere by laser prepulses which cause explosion of the outer DT shells (similar to that shown in FIG. 2A). The two regions are an approximation to the density gradient formed. During the subsequent implosion laser light is absorbed in the outer atmosphere at the critical density (where the optical and plasma frequencies are equal) heating electrons. Energy is conducted in by thermal electron to ablate surface of neon ablator 63. Reaction forces to the optimally shaped laser pulse then drive the unheated ablator and the DT (shell 61) inward to near isentropic high density thermonuclear conditions. Ignition occurs in the central region of the imploded DT and a burn front propagates outward.

Due to quantitative uncertainties in the various plasma effects, laser requirement for a reactor are not firm at this time. However, based on calculations, computer experiments, and actual tests thus far conducted, it appears that for solid targets, laser energies in excess of 100 KJ and powers exceeding 10$^{15}$W will be required for fusion reactors in addition to the short wavelength capability. Also, based on the above, it is believed that the power requirement can be relaxed by more than an order of magnitude by use of hollow targets.

It has thus been shown that the present invention provides laser fusion targets, of both the solid and hollow shell type, having material for forming an atmosphere around the target for implosion of the centrally located fuel.

While particular embodiments of the invention have been illustrated and described, modifications and changes will become apparent to those skilled in the art, and it is intended to cover in the appended claims all such modifications and changes that come within the spirit and scope of the invention.

What we claim is:

1. In a target having a centrally located substantially spherically configured quantity of solid fuel for implosion by a pulse of laser energy and having no material therein with a Z of over about 13, the improvement comprising: means in spaced apart and non-contiguous relationship surrounding said fuel for at least providing an atmosphere about said fuel for ensuring electron transport around said fuel and enhancing subsequent implosion symmetry of said fuel, said fuel being configured as a hollow shell, said means consisting of at least one outer layer of substantially solid atmosphere forming material having a Z of 1-13, said atmosphere forming material comprising a shell positioned about said fuel defining a space therebetween, said space being filled with He, said fuel and said shell of atmosphere forming material being each composed of DT, said layer of atmosphere forming material being impacted and at least partially exploded by at least one separate and distinct laser prepulse to produce said atmosphere about said fuel prior to implosion of said fuel by said pulse of laser energy.

2. A laser-initiated target for producing a plasma upon implosion by laser energy comprising a centrally located substantially spherically configured quantity of solid fuel, said fuel being configured as a hollow shell and selected from the group consisting of DT and D$_2$, and means located in non-contiguous and spaced apart relationship surrounding said fuel for at least creating an atmosphere about said fuel for ensuring electron transport around said fuel and enhancing subsequent implosion symmetry of said fuel, said means consisting of at least one outer layer of substantially solid atmosphere forming material having a Z of 1-13, said layer of atmosphere forming material consisting of a shell positioned about said fuel defining a space therebetween, said space being evacuated or filled with a gas selected from the group consisting of He, H$_2$ and DT. said shell of atmosphere forming material being selected from the group consisting of DT, glass and carbon and having a mass about eight times greater than said fuel mass.

* * * * *